United States Patent
Dunn et al.

[11] Patent Number: 5,970,194
[45] Date of Patent: Oct. 19, 1999

[54] OPTICAL FIBER HAVING HERMETICALLY SEALABLE SECTION

[75] Inventors: Paul E. Dunn, Westfield, Mass.; Geary R. Carrier, Hampton, Conn.; Anthony C. Boncore, Jr., Chicopee, Mass.

[73] Assignee: Uniphase Telecommunications Products, Inc., Bloomfield, Conn.

[21] Appl. No.: 09/025,915

[22] Filed: Feb. 19, 1998

[51] Int. Cl.⁶ .................................. G02B 6/255
[52] U.S. Cl. ................... 385/95; 385/94; 385/99
[58] Field of Search ................. 385/95–99, 33, 385/35, 73, 74, 75, 93, 94, 138, 139

[56] References Cited

U.S. PATENT DOCUMENTS

| | | | |
|---|---|---|---|
| 4,033,668 | 7/1977 | Presby | 385/95 |
| 4,214,809 | 7/1980 | Reh | 350/96.2 |
| 4,252,457 | 2/1981 | Benson et al. | 403/284 |
| 4,345,816 | 8/1982 | Nakai et al. | 350/96.2 |
| 4,707,065 | 11/1987 | Jenkins | 350/96.2 |
| 4,738,505 | 4/1988 | Jones | 350/96.2 |
| 4,822,130 | 4/1989 | Maranto et al. | 350/96.2 |
| 4,859,021 | 8/1989 | Wall | 350/96.2 |
| 4,865,410 | 9/1989 | Estrado et al. | 350/96.2 |
| 4,904,046 | 2/1990 | Paschke et al. | 350/96.2 |
| 5,151,967 | 9/1992 | Ebinuma | 385/138 |
| 5,177,806 | 1/1993 | Abbott et al. | 385/76 |
| 5,210,815 | 5/1993 | Alexander et al. | 385/138 |
| 5,515,473 | 5/1996 | Yamauchi et al. | 385/138 |
| 5,588,086 | 12/1996 | Fan | 385/138 |
| 5,613,031 | 3/1997 | Tanabe et al. | 385/138 |
| 5,793,916 | 8/1998 | Dahringer et al. | 385/95 |

*Primary Examiner*—Phan T. H. Palmer
*Attorney, Agent, or Firm*—McCormick, Paulding & Huber LLP

[57] ABSTRACT

An optical fiber having a core, a cladding layer, a buffer layer, and a midsection for forming a hermetic seal to the fiber. First and second sections of a length of the optical fiber are separated by the midsection that includes a jacket hermetically sealed to the fiber, the jacket having a hermetically sealable outer surface. First and second stress relief joints are formed between the jacket and the buffer layers of the first and second sections of the length of the fiber. A method is disclosed for fabricating the optical fiber having a hermetically sealable section.

24 Claims, 4 Drawing Sheets

OPTICAL FIBER HAVING HERMETICALLY SEALABLE SECTION

FIELD OF THE INVENTION

This invention relates generally to optical fibers, and more particularly to an hermetically sealed feedthrough for optical fibers.

BACKGROUND

Optical components, such as, for example, lasers, modulators, demodulators, etc., are often expected to function for extended periods of time in potentially damaging environments. Accordingly, such an optical component is typically enclosed in a packages that provides an acceptable operating environment internal to the package. The predictable and continued operation of component is thus ensured. However, optical signals must typically enter and exit a component via a single or multimode fiber optic cable. A hermetic seal to the fiber preserves the integrity of the inner environment of the component package. Unfortunately, known hermetic seals are not always satisfactory. Most available fiber optic hermetic seals are unduly complex, or substantially weaken the fiber such that routing the fiber inside the package is a delicate task, prone to injuring the fiber and/or rendering it more susceptible to subsequent injury in service due to vibration, temperature cycling, etc. Degradation or failure of the optical component can result.

For example, a fiber optic cable includes a core, a cladding disposed about the core, and a buffer layer disposed about the cladding layer. As is well known by those of ordinary skill in the art, the indices of refraction and the relative dimensions of the core and cladding are selected to provide the desired optical performance of the cable. The buffer layer primarily provides strength and stress relief to protect the delicate cladding and core.

One known technique for providing a hermetic seal between a package and an optical fiber is illustrated in cross section in FIG. 1. A length of the optical fiber is stripped of the buffer layer 4, leaving the cladding layer 3 and the core 2. A first hermetic sealing joint 5 seals the cladding layer 3 of the fiber to a ferrule 6. Typically the stripped length 1 of the fiber is metallized and the first hermetic sealing joint is a solder joint between the metallized cladding and the wall 8. A second solder joint 7 seals the ferrule 6 to the wall 8 of a package. An epoxy joint secures the buffer layer 4 to the ferrule 6. The length of fiber 1 available inside the package for routing to optical components includes only the cladding layer 3 and the core 2; the buffer layer is absent. Accordingly, the length 1 of fiber is prone to microcracks and other damage and routing the cable is problematic, as bends, twists, or other stress producing configurations should be avoided. Though certain components, such as laser diodes, may not require significant routing of the feedthrough fiber inside the package, other components, such as components based on lithium niobate, can necessitate such routing. Despite careful designs that avoid bends or turns, and appropriate care during assembly of the component, the fiber may fail or degrade in service. A naked fiber, i.e., one devoid of cladding, can be the weakest link in the component performance chain. Accordingly, there is a need for an improved hermetic seal for optical fibers.

It is an object of the present invention to provide an improved hermetic optical fiber feedthrough.

It is a further object of the present invention to provide a simple and economical optical fiber hermetic seal that is easily assembled.

Yet another object of the invention is to provide a optical fiber having a hermetic seal located midway between sections of fiber, where both sections include a buffer layer.

Other objects of the invention will in part be apparent and in part appear hereinafter.

SUMMARY OF THE INVENTION

The present invention achieves the foregoing and other objects by providing a simple and economical hermetic seal for an optical fiber.

In one aspect, the invention provides an article including a length of optical fiber having a hermetic feedthrough midsection. The length of fiber includes a cladding layer disposed about a core; a first fiber section having a first buffer layer disposed about the cladding layer, the first buffer layer terminating in a first buffer layer endwall; a second fiber section having a second buffer layer disposed about the cladding, the second buffer layer terminating in a second buffer layer endwall; a fiber midsection bounded by the first and second buffer layer end walls and having a metallic layer disposed about the cladding layer; a jacket having inner and outer hermetically sealable surfaces, the jacket disposed about the midsection so as to overlap the first and second buffer layer sections; a hermetic sealing joint formed between the inner surface of the jacket and the metallic layer; and first and second stress relief joints formed between the jacket and the first and second buffer layer sections.

In another aspect, the invention provides a method for forming a hermetically sealable section in a length of optical fiber, the method including the steps of: providing a length of optical fiber having a core, a cladding layer disposed about the core and a buffer layer disposed about the cladding layer; removing a length of the buffer layer to define a gap therein bounded by first and second buffer layer ends and to expose a length of the cladding layer having an exposed outer surface; adhering a layer of metal to at least a portion of the outer surface; providing a jacket over the gap and overlapping the buffer layer of the fiber, the jacket having first and second ends and hermetically sealable inner and outer surfaces, forming a hermetic sealing joint between the inner surface of the jacket and the metallic layer; and forming first and second stress-relief joints, adjacent the first and second ends of the jacket, between the jacket and the buffer layer of the fiber.

The invention thus advantageously provides an optical fiber having a buffer layer and a hermetically sealable section for sealing to a package. Thus the fiber internal to package includes a buffer layer, thereby providing a more robust component that is easier to assemble and less likely to be damaged or to degrade over time. In addition, the invention allows more versatile component design as a length the fiber may more readily be bent within the package to route optical signals, as is often required with lithium niobate optical components. Advantageously, the article and method of the invention are considered suitable for single mode fibers, multi mode fibers, and polarization-maintaining fibers.

DETAILED DESCRIPTION OF THE PREFERRED EMBODIMENTS

Figure 2:
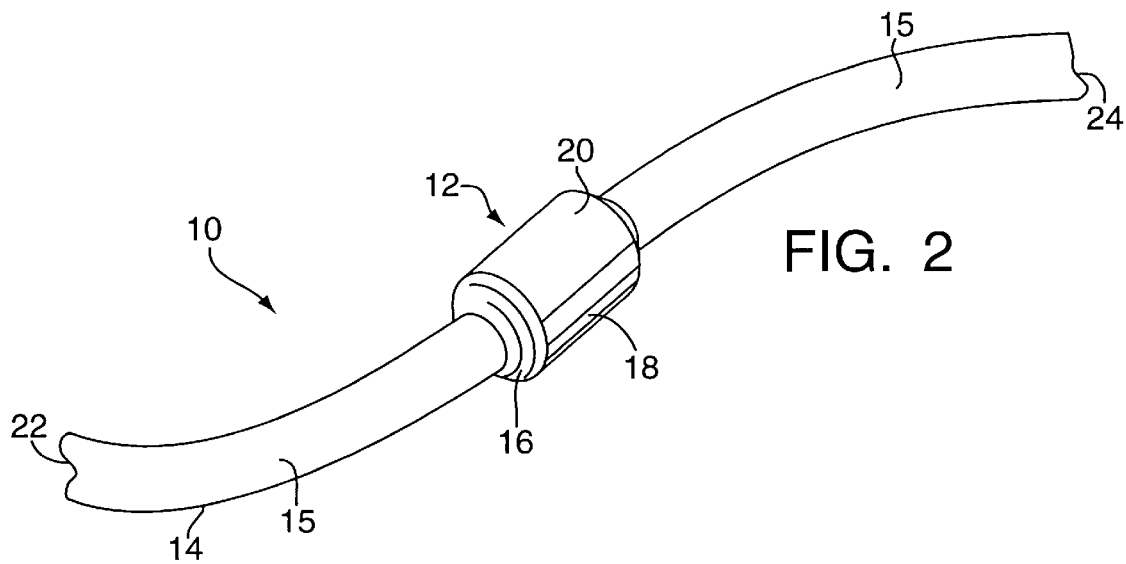
FIG. 2 illustrates a length if optical fiber including a hermetically sealable section according to the invention.

As illustrated in FIG. 2, reference numeral 10 indicates generally a length of optical fiber 14 incorporating a hermetic sealable section 12 according to the invention. The section 12 includes a jacket 18 disposed about and hermetically sealed to the fiber 14. Stress relief joints 16 bond the jacket 18 to the buffer layer of the fiber 14. The jacket 18 includes a metallic outer surface 18 suitable for forming a hermetic seal, such as by soldering, to a package.

Figure 3:
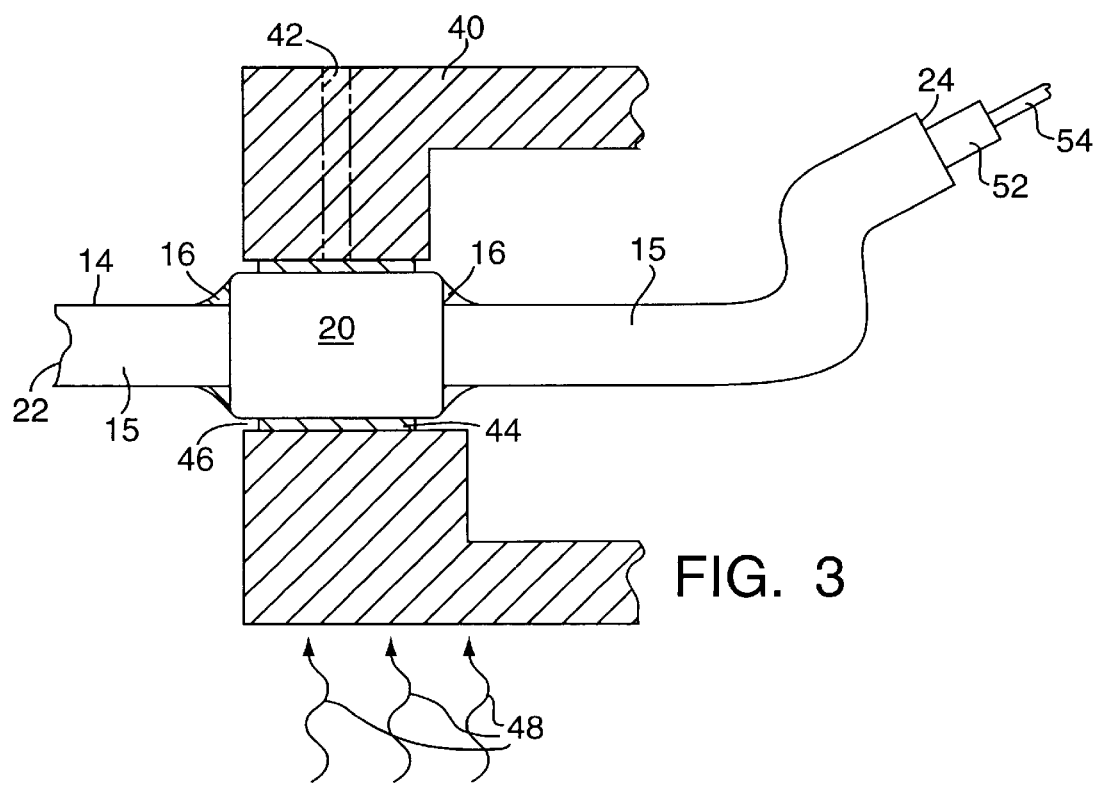
FIG. 3 illustrates the length of optical fiber of FIG. 1 hermetically sealed to a package for feeding an optical signal from outside of the package to the interior thereof.

FIG. 3 illustrates the length of fiber 14 hermetically sealed to a package 40 shown in cross section (the jacket 18 is not shown in cross-section in FIG. 3). A hermetic sealing joint 44, such as a solder joint, hermetically seals the outer surface 20 of the jacket 18 to the package 40. A gap 46 is provided for accommodating the solder of the hermetic joint 44. Typically, the jacket 18 is placed in the package 40 as illustrated in FIG. 3, and heat transferred to the package, indicated by the wavy lines 48, such as by placing the package 40 on a suitably heated hot plate. The package 40 can include an access hole 42 for soldering the outer surface 20 of the jacket 18 to the package 40. A slug of solder placed in the hole is heated and flows about the outer surface 20 of the jacket 14 to form the hermetic joint 44. The outer surface 20 can be coated with a suitably benign solder flux prior to inserting the jacket 18 into the package 40. As an alternative to providing the access hole 40, a preform of solder can be placed about the surface 20 prior to inserting the jacket 18 into the package 40. The hermetic sealing joint may also be formed using a suitable epoxy.

Note that the first and second ends of the fiber, 22 and 24, are inside and outside, respectively, the package 40. Thus the delicate cladding layer 52 and core 54 of the fiber 14 need not be exposed until after the fiber 14 is routed as necessary inside the package 40 and connection is to be made to an appropriate optical component. A more robust, environmentally stable, and easily assembled optical component results.

Figure 4A:
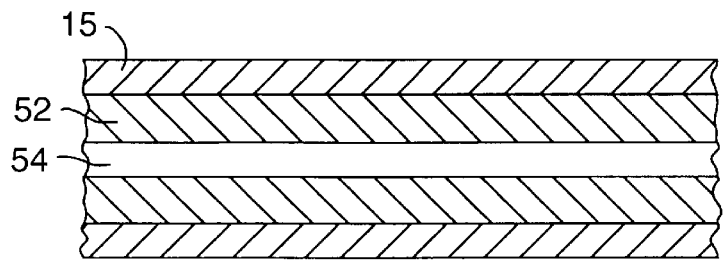
FIGS. 4A–4F illustrate forming the hermetically sealable section in the length of optical fiber of FIG. 1.

FIGS. 4A–4F illustrate forming the hermetically sealable section 12 in the length of optical fiber. With reference to FIG. 4A, prior to formation of the hermetically sealable section, the length of fiber 14 includes the core 54, the cladding layer 52 disposed about the core 54, and the buffer layer 15 disposed about the cladding layer 52.

Figure 4B:
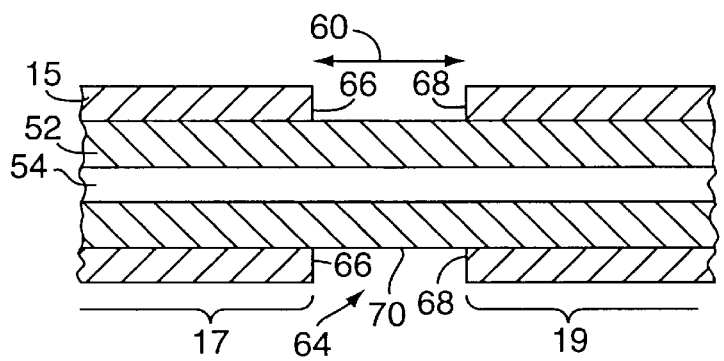

As shown in FIG. 4B, a section of the buffer layer is relieved, that is, a length of the buffer layer 15 is removed, forming buffer layer end walls 66 and 68, creating a gap 64 and exposing a surface 70 of the cladding layer 52 having a length 60. The end walls 66 and 68 need not be perpendicular to the exposed cladding surface 70, thought typically such perpendicularly is desirable. The length of the buffer layer 15 can be removed to form the gap 64 by several methods known in the art, such as the selective application of high pressure chilled air, selective etching of the cladding layer or by a rotating abrasive tool, such as a rotating brush. Methylene chloride is one etchant known to those of ordinary skill in the art to be effective in etching buffer layers. After formation of the gap 64, the fiber 14 includes a first and second buffer layer lengths, 17 and 19 respectively, separated by the gap 64. Forming the gap 64 is more difficult and involved than prior art techniques involving removing a length of buffer layer from one end of the fiber; however, retention of the buffer layer on both sides of the gap provides a hermetic optical fiber feedthrough having considerably enhanced structural integrity.

Figure 4C:
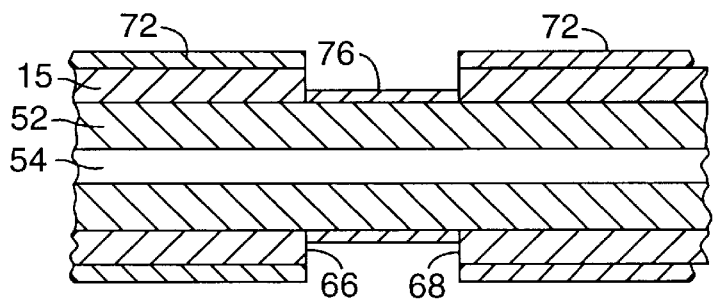

As illustrated if FIG. 4C, a metallic layer 76 is next formed on the exposed surface 70 of the cladding layer 52. The metallic layer 76 can be deposited, such as by sputtering or evaporation, or by other similar techniques understood by those of ordinary skill in the art, in light of the disclosure herein, to be appropriate. As one example, a metallic layer can include a layer of aluminum sputtered onto the surface 76, a layer nickel sputtered onto the aluminum, and a layer of gold sputtered over the nickel. Typically, the layers of aluminum and nickel are each one to a few microns thick, and the layer of gold is several microns thick. Alternatively, the metallic layer 76 may be plated onto the exposed cladding surface 70. For example, a nickel phosphorous plating solution, typically having less than seven percent phosphorous, can be an acceptable plating solution. Gold can be plated or sputtered over the plated nickel. As is known by those of ordinary skill, the surface 76 should is appropriately cleaned prior to plating or sputtering.

If necessary, a removable masking layer 72 can be placed over the buffer layer to prevent forming a metallic layer on the buffer layer 15 of the fiber optical cable 14. If necessary for forming the gap 64, the masking layer 72 can be placed on the buffer layer prior to forming the gap 64 and then reused during forming the metallic layer 76. The masking layer 72 can be removed after formation of the masking layer 72.

Figure 4D:
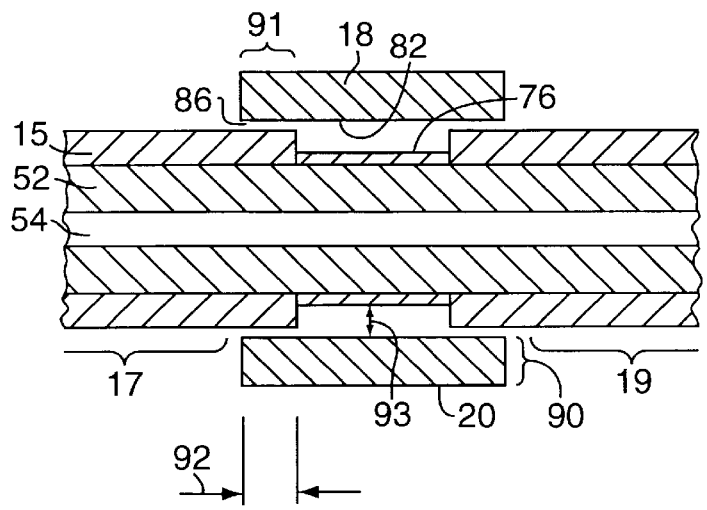

Next, as depicted in FIG. 4D, the jacket 18, having a sufficient length such that jacket end portions, such as the end portion 91, overlap the first and second buffer layer sections, is formed or placed over the gap 64. The jacket 18 can be a gold-plated Kovar tube or sleeve having an inner bore of a sufficient diameter for sliding over the buffer layer 15 of the fiber optic cable 14 for leaving an appropriate overlap gap 86 between the tube and first and second sections, 17 and 19, of the buffer layer 15. The gap 86 is typically selected to be on the order of one to a few thousandths of an inch. The overlap length 92 selected to maintain the structural integrity of the fiber, as is understood by one of ordinary skill in the art. Note that the jacket 18 need not be slid over the cable for covering the gap 64. For example, a jacket can have a longitudinally extending gap for accommodating the cable 14, and can be placed over the gap 64 and crimped using an appropriate crimping tool.

The jacket 18 includes a metallic inner surface 82, typically gold, for forming a hermetic seal to the metallic layer 76 formed on the exposed cladding surface 70. A hermetic sealing gap 93 is bounded by the inner surface 82 of the jacket 18 and the metallic layer 76.

Figure 4E:
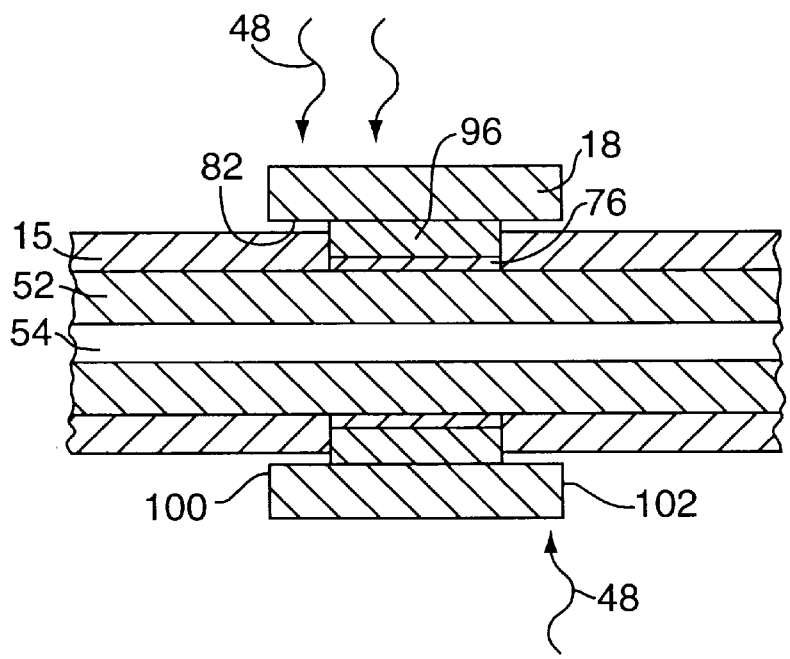

Subsequently, as illustrated in FIG. 4E, heat is applied to the jacket 18, represented again by wavy lines 48, to the jacket to form a hermetic sealing joint 96 between jacket 18 and the metallic layer 76. Typically a preform of solder is placed over the metallic layer 76 prior to placing the jacket 18 over the gap 64 as illustrate in FIG. 3D. For ease of illustration, such a preform is not shown in FIG. 4E. The preform flows about the gap 93, forming the solder-type hermetic sealing joint 96. Solders suitable for forming the hermetic sealing joints between the jacket 18 and the metallic layer 76, and between the jacket 18 and the package 40, are available from the Indium Corporation of America. Note the epoxies may also used in place to form a hermetic sealing joint, such as are available from the Epotek Corporation. Such epoxies are also often cured via the application of heat.

Figure 4F:
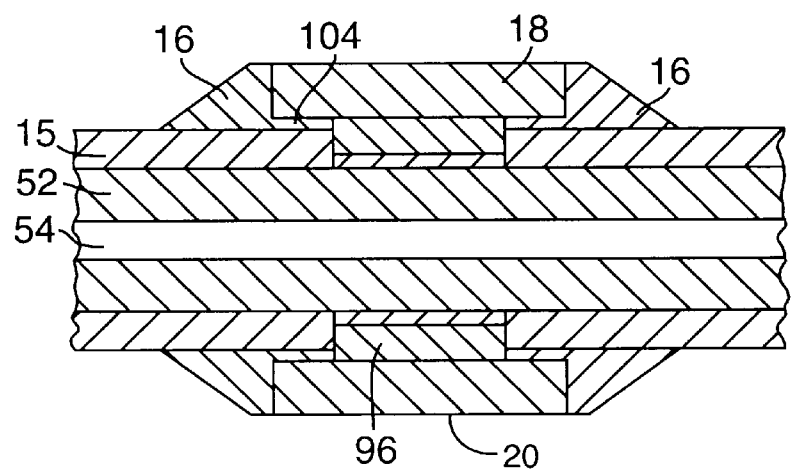

Finally, as shown in FIG. 4F, stress relief joints 16 are formed adjacent the first and second ends 100 and 102 (shown in FIG. 3E) of the jacket 18 and the buffer layer 15 of the fiber 14. The stress relief joints can taper away from the jacket 18 to the surface to the buffer layer 15 or can be largely confined to the area 104 (i.e., filling the overlap gap 86) between the inner surface 82 of the jacket 18 and the first and second buffer layer sections 17 and 19. The epoxy can be inserted into the gap 86 with a syringe. As understood by one of ordinary skill in the art, in light of the disclosure herein, the jacket 18 and stress relief joints 16 serve to preserve the mechanical strength and integrity of the length of fiber 14 and the hermetically sealable section 12. The flexibility of the cured epoxy that forms the joints 16 is selected to match the fiber for providing appropriate stress relief, as is the overlap 92 of the jacket 18. Furthermore, the epoxy selected for forming the joints 16 can have a viscosity when uncured such that it "wicks in" to fill the gap 86 and forms the joint 104 indicated in FIGS. 4D and 4F. One epoxy found suitable for many fibers is Epotek 301-2FL.

The fiber 14 can be a polarization maintaining fiber, such as the Fujikura fiber available from the Fuji Corporation. The dimensions of the jacket and the solder used to form the hermetic sealing joint between the jacket and the metallic layer have been found to affect the polarization of the optical signal traveling on the fiber 14. For example, for a Fujikura fiber having a cladding outer diameter of 125 microns and a buffer layer outer diameter of 400 microns, a gold plated kovar tube having a length of approximately 10 m to approximately 15 mm and an inner diameter of 0.025"–0.030", soldered to the metallic layer on the fiber using Indialloy #2 solder along an outer surface length 60 of approximately 5 mm, has been found to result in acceptable maintenance of the polarization of the optical signal.

It is thus seen that the invention efficiently obtains the objects set forth above, among those made apparent from the preceding description.

Although the invention has been shown and described with respect to an exemplary embodiment thereof, it is understood by those of ordinary skill in the art in light of the foregoing description that changes, omissions, and additions in from may be made without departing from the-spirit and scope of the invention. The foregoing description is intended to be illustrative and not limiting.

Having described the invention, what is claimed as new and secured by Letters Patent is:

1. An optical fiber article having a core and cladding layer disposed about the core, the article comprising
   a first optical fiber length having a first buffer layer disposed about said cladding layer, said first buffer layer terminating in a first buffer layer endwall;
   a second optical fiber length having a second buffer layer disposed about said cladding, said second buffer layer terminating in a second buffer layer endwall;
   a fiber midsection length having a metallic layer disposed about said cladding layer;
   a jacket having inner and outer hermetically sealable surfaces, said jacket disposed about said fiber midsection length so as to overlap said first and second buffer layers;
   a hermetic sealing joint formed between said inner surface of said jacket and said metallic layer; and
   first and second stress relief joints formed between said jacket and said first and second buffer layers.

2. The article of claim 1 wherein said jacket includes a sleeve having an inner bore of an inner diameter sufficient for sliding over at least one of said first and second buffer layers for disposition over said midsection and overlapping said first and second buffer layers.

3. The article of claim 2 wherein said sleeve is a kovar sleeve.

4. The article of claim 3 wherein said hermetic sealing joint is a solder joint.

5. The article of claim 1 wherein said optical fiber article maintains the polarization of an optical signal guided thereby.

6. The article of claim 1 wherein said and hermetic sealing joint is a solder joint.

7. The article of claim 1 wherein said metallic layer includes a layer of aluminum, a layer of nickel over said layer of aluminum, and a layer of gold over said layer of nickel.

8. The article of claim 1 wherein said metallic layer includes a layer of plated nickel phosphorous.

9. The article of claim 1 wherein said first and second stress relief joints include first and second epoxy joints, respectively.

10. The article of claim 1 wherein said jacket overlaps said first and second buffer layers so as to form a stress relief gaps between said inner surface of said jacket and said first and second buffer layers, and wherein said stress relief joints include epoxy joints formed inside said stress relief gaps for bonding said inner surface said jacket to said first and second buffer layers.

11. An hermetic package for providing an hermetic environment internal to the package and for providing optical communication between the internal environment of the package and an environment external to the package, comprising
   a housing for hermetically enclosing the internal environment of the package, the housing including at least one metallic wall having a passage therethrough bounded by passage walls;
   an optical fiber having a core and cladding layer disposed about the core, the optical fiber having a first length external to the package and including a first buffer layer length disposed about said cladding along said first length, a midsection passing through said passage and hermetically sealed to said passage walls, and a second length internal to said housing and including a second buffer layer disposed about said cladding layer along said second length.

12. A method of providing a length of optical fiber having a hermetically-sealable midsection, comprising the steps of:
   providing a length of optical fiber having a core, a cladding layer disposed about the core and a buffer layer disposed about the cladding layer;
   forming a gap in the buffer layer to expose a length of said cladding layer having a continuous outer surface, bounded by first and second buffer layer end walls of first and second buffer layer sections of said fiber;
   adhering a layer of metal to at least a portion of said outer surface;
   disposing a jacket about said gap, said jacket having first and second ends overlapping said first and section buffer layer sections, the jacket having an outer surface and a bore therethrough bounded by an inner surface, said inner and outer surfaces including at least portion suitable for forming hermetic seals;
   forming a hermetic sealing joint between said inner surface of said jacket and said layer of metal; and
   forming first and second stress-relief joints between the jacket and said first and second buffer layer sections.

13. The method of claim 12 wherein the step of providing the jacket includes the step providing a gold plated kovar sleeve.

14. The method of claim 13 wherein the step of forming stress relief joints includes forming epoxy joints between the sleeve and the buffer layer of the fiber.

15. The method of claim 14 wherein said step of forming the hermetic sealing joint includes forming a solder joint between the sleeve and the metallic layer.

16. The method of claim 12 wherein the step of forming the gap includes removing a length of the buffer layer with a rotating abrasive article.

17. The method of claim 12 wherein said step of forming the hermetic sealing joint includes forming a solder joint between the jacket and the metallic layer.

18. The method of claim 12 wherein said step of forming stress relief joints includes forming epoxy joints between the jacket and the buffer layer of the fiber.

19. The method of claim 12 wherein said step of adhering a metallic layer includes the steps of forming a layer of aluminum of the exposed surface of the cladding, forming a layer of nickel over the layer of aluminum, and forming a layer of gold over the layer of nickel.

20. The method of claim 12 wherein the step of forming the metallic layer includes plating a metal onto the exposed surface of the cladding.

21. An optical fiber article comprising a core, a cladding layer disposed about said core, and a buffer layer disposed about said cladding layer, said fiber including a fiber midsection relieved of said buffer layer and including a metallic layer disposed on said cladding layer;

a jacket having an inner surface forming a hermetic seal with said metallic layer, an outer hermetically sealable surface, and first and second jacket end portions overlapping said buffer layer; and first and second stress relief joints formed, respectively, between said first and second jacket end portions and said buffer layer.

22. The method of claim 21 wherein the step of forming the gap includes etching away a length of the buffer layer.

23. The method of claim 21 wherein the step of forming the gap includes removing a length of the buffer layer with pressurized air.

24. A method of providing a package for housing an optical device for communicating an optical signal via an optical fiber passing through and hermetically sealed to a wall of the package, comprising the steps of:

providing a length of optical fiber having a core, a cladding layer disposed about the core and a buffer layer disposed about the cladding layer;

forming a gap in the buffer layer to expose a length of said cladding layer having a continuous outer surface, bounded by first and second buffer layer end walls of first and second buffer layer sections of said fiber;

adhering a layer of metal to at least a portion of said outer surface;

disposing a jacket about said gap, said jacket having first and second ends overlapping said first and section buffer layer sections, the jacket having an outer surface and a bore therethrough bounded by an inner surface, said inner and outer surfaces including at least portion suitable for forming hermetic seals;

forming a hermetic sealing joint between said inner surface of said jacket and said layer of metal; and forming first and second stress-relief joints between the jacket and said first and second buffer layer sections;

forming an aperture passing through the wall of the package; and forming a second hermetic sealing joint between the jacket and the package.

\* \* \* \* \*

UNITED STATES PATENT AND TRADEMARK OFFICE
CERTIFICATE OF CORRECTION

PATENT NO. : 5,970,194
DATED : October 19, 1999
INVENTOR(S) : Dunn et al.

It is certified that error appears in the above-identified patent and that said Letters Patent is hereby corrected as shown below:

Column 1,
Line 14, please delete "packages" and insert -- package --.
Line 46, after "epoxy joint" please insert -- 9 --.
Line 60, please delete "cladding" and insert -- a buffer layer --.

Column 2,
Line 66, please delete "if" and insert -- of --.

Figure 1:
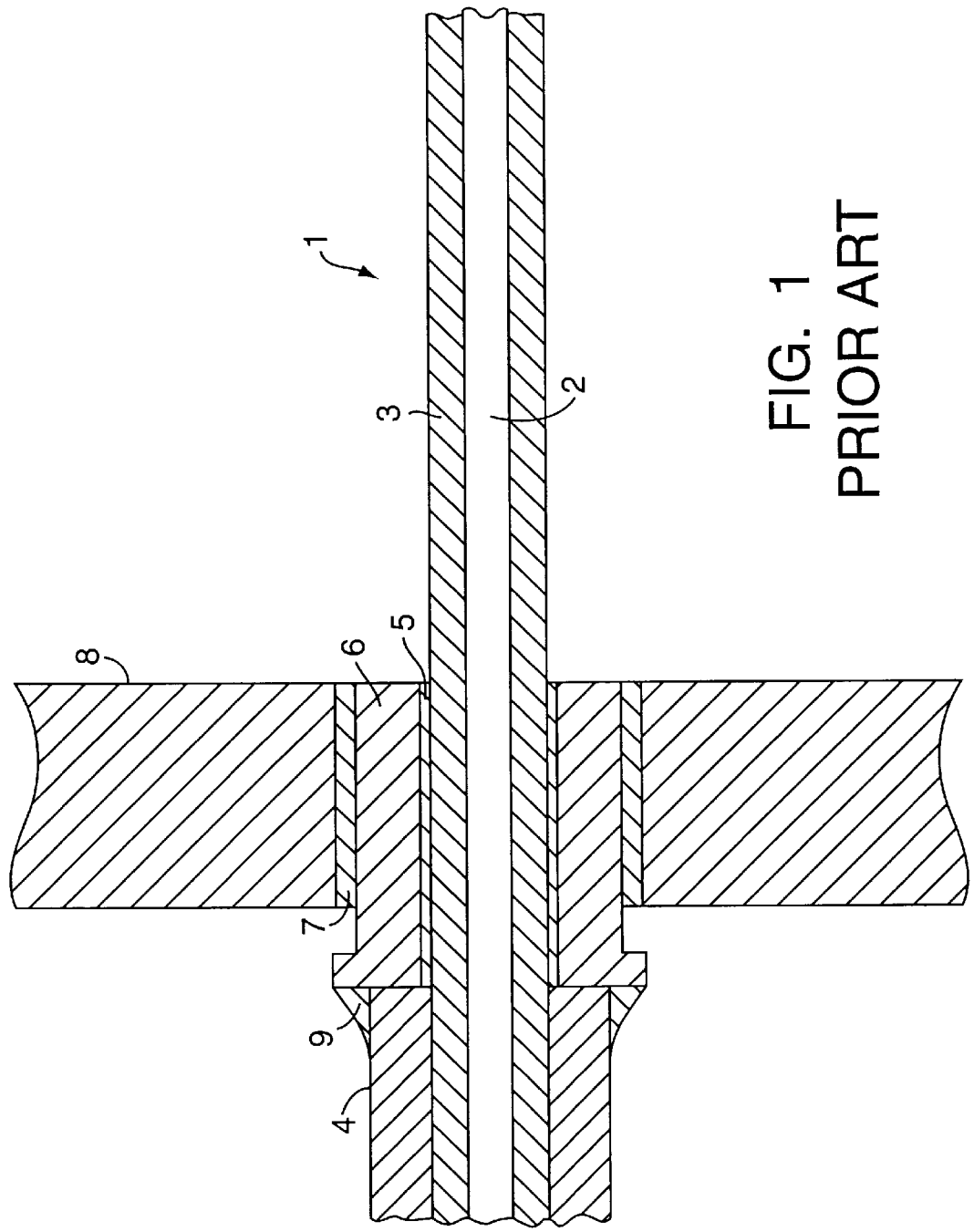
FIG. 1 illustrates one known prior art technique for providing a hermetic seal between and optical fiber and a package.

Column 3,
Line 1, please delete "FIGURE1" and insert -- FIGURE 2 --.
Line 5, please delete "FIGURE 1" and insert -- FIGURE 2 --.
Line 15, please delete "18" and insert -- 20 --.
Line 42, please delete "to be".
Line 56, please delete "thought" and insert -- though --.

Column 4,
Line 12, please delete "76" and insert -- 70 --.
Line 20, please delete "76" and insert -- 70 -- and delete "is" and insert -- be --
Line 28, please delete "masking" and insert --metallic --.
Line 29, please delete "72" and insert --76 --.

UNITED STATES PATENT AND TRADEMARK OFFICE
CERTIFICATE OF CORRECTION

PATENT NO. : 5,970,194
DATED : October 19, 1999
INVENTOR(S) : Dunn et al.

It is certified that error appears in the above-identified patent and that said Letters Patent is hereby corrected as shown below:

Column 4,
Line 40, please delete "92" and insert -- is --.
Line 52-53, please delete "to the jacket".
Line 57, please delete "illustrate" and insert
-- illustrated -- and delete "FIG. 3D" and insert -- FIG 4D --.

Column 5,
Line 3, please delete "FIG. 3E" and insert -- FIG. 4E --.
Line 6, please delete "area" and insert -- joint --.
Line 29, please delete "10 m" and insert -- 10mm --.
Line 31, after "layer " and insert -- 76 --.

Claim 22, line 1, please delete "21" and insert -- 12 --.
Claim 23, line 1, please delete "21" and insert -- 12 --.

Signed and Sealed this

Seventh Day of August, 2001

*Attest:*

NICHOLAS P. GODICI
*Attesting Officer*     *Acting Director of the United States Patent and Trademark Office*